(12) United States Patent
El-Essawy et al.

(10) Patent No.: US 8,519,843 B2
(45) Date of Patent: Aug. 27, 2013

(54) POWER DISTRIBUTION DEVICE COMMUNICATIONS PLATFORM

(75) Inventors: Wael R. El-Essawy, Austin, TX (US); Thomas W. Keller, Jr., Austin, TX (US); Juan C. Rubio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 13/014,749

(22) Filed: Jan. 27, 2011

(65) Prior Publication Data

US 2012/0195355 A1   Aug. 2, 2012

(51) Int. Cl.
| | |
|---|---|
| G08B 1/08 | (2006.01) |
| H04M 11/04 | (2006.01) |
| H04Q 1/30 | (2006.01) |
| G05B 11/01 | (2006.01) |
| G08C 19/16 | (2006.01) |
| G08C 19/12 | (2006.01) |

(52) U.S. Cl.
USPC ............. 340/538; 340/12.32; 340/13.23

(58) Field of Classification Search
USPC ................ 340/538, 12.32, 13.23
See application file for complete search history.

(56) References Cited

U.S. PATENT DOCUMENTS

| | | | | |
|---|---|---|---|---|
| 3,623,049 A | * | 11/1971 | Hill ............................ | 340/515 |
| 4,185,272 A | * | 1/1980 | Feiker ......................... | 340/3.54 |
| 4,446,458 A | * | 5/1984 | Cook ........................... | 340/3.21 |
| 5,650,773 A | * | 7/1997 | Chiarello .................... | 340/691.8 |
| 5,696,695 A | * | 12/1997 | Ehlers et al. .................. | 700/286 |
| 5,861,683 A | | 1/1999 | Engel et al. | |
| 6,084,758 A | | 7/2000 | Clarey et al. | |
| 6,163,144 A | | 12/2000 | Steber et al. | |
| 6,614,326 B2 | * | 9/2003 | Merriman et al. ............. | 333/100 |
| 6,708,126 B2 | | 3/2004 | Culler et al. | |
| 6,940,289 B2 | | 9/2005 | Hyacinthe et al. | |
| 6,961,641 B1 | | 11/2005 | Forth et al. | |
| 7,076,378 B1 | | 7/2006 | Huebner | |
| 7,269,753 B2 | | 9/2007 | Farkas et al. | |
| 7,315,161 B2 | | 1/2008 | Zribi et al. | |
| 7,415,368 B2 | | 8/2008 | Gilbert et al. | |
| 7,453,267 B2 | | 11/2008 | Westbrock, Jr. et al. | |
| 7,493,222 B2 | | 2/2009 | Bruno | |
| 7,546,214 B2 | | 6/2009 | Rivers, Jr. et al. | |

(Continued)

FOREIGN PATENT DOCUMENTS

WO   WO2009/123586 A1   10/2009

*Primary Examiner* — Daniel Wu
*Assistant Examiner* — Emily C Terrell
(74) *Attorney, Agent, or Firm* — Francis Lammes; Stephen J. Walder, Jr.; Eustus D. Nelson

(57) ABSTRACT

A communications system is provided for direct communications between powered elements. A controller hub injects a first message via a modulated communication signal onto a branch circuit using a hub-side power line communication (PLC) coupler. An element-side PLC coupler associated with a powered element in a set of powered elements detects the first message and sends an interrupt to a mini-controller in the powered element. The mini-controller receives the interrupt from the element-side PLC coupler, extracts the first message using the element-side PLC coupler; reads a destination identifier in the first message; compares the destination identifier in the first message to a mini-controller identifier in the mini-controller; sends an acknowledgement message back to the controller hub in response to the destination identifier in the first message matching the mini-controller identifier, and forwards the first message to the powered element. The powered element performs a command identified in the first message.

14 Claims, 9 Drawing Sheets

(56) References Cited

U.S. PATENT DOCUMENTS

| | | |
|---|---|---|
| 7,605,594 B2 | 10/2009 | Blades |
| 2002/0030476 A1* | 3/2002 | Budniak et al. ................. 324/67 |
| 2006/0028347 A1* | 2/2006 | Ziejewski et al. ............. 340/635 |
| 2008/0079437 A1 | 4/2008 | Robarge et al. |
| 2009/0206059 A1 | 8/2009 | Kiko |
| 2009/0282274 A1 | 11/2009 | Langgood et al. |
| 2009/0307515 A1 | 12/2009 | Bandholz et al. |
| 2011/0032111 A1* | 2/2011 | Gallavan ....................... 340/659 |
| 2011/0133693 A1* | 6/2011 | Lowenthal et al. ........... 320/109 |

* cited by examiner

POWER DISTRIBUTION DEVICE COMMUNICATIONS PLATFORM

BACKGROUND

The present application relates generally to an improved data processing apparatus and method and more specifically to mechanisms for a power distribution device communications platform.

In known data centers, power is supplied to elements within a data center via one or more utility providers as well as additional backup systems which may be comprised of a backup generator, uninterruptable power supplies, or the like. In addition to power being delivered to the powered information technology (IT) equipment within the data center, communication in to, out of and between elements is provided using numerous cables to interconnect the various elements of the system together. While the communication cables are mainly for carrying data related to the business of the data center, using the communication cables to also carry maintenance data that is used to maintain the powered IT equipment has limitations. While IT personnel in a data center have privileges and permissions necessary to access the communications infrastructure in a data center, such permissions are not always granted to facilities personnel. The facility personnel not having permissions limits the management tasks that facilities personnel may perform without special access to the communications and server systems. Also, given that facilities personnel offer vital electricity resources and cooling resources to the data center IT equipment, granting facilities personnel access to the actual power allocation and usage information throughout the data center by direct access to this data at the power distribution level makes more sense, instead of escalating this information through software stack, complicating the power management infrastructure.

SUMMARY

In one illustrative embodiment, a method, in a data processing system, is provided for directing communication between powered elements. The illustrative embodiment receives an interrupt from an element-side power line communication (PLC) coupler associated with a powered element in a set of powered elements, wherein the PLC coupler detects a first message injected onto at least one branch circuit by a controller hub via a first modulated communication signal using at least one hub-side power line communication (PLC) coupler and wherein the at least one element-side PLC coupler sends the interrupt in response to detecting the first message on the branch circuit. The illustrative embodiment extracts the first message using the at least one element-side PLC coupler; reads a destination identifier in the first message; compares the destination identifier in the first message to a mini-controller identifier, sends an acknowledgement message hack to the controller hub in response to the destination identifier in the first message matching the mini-controller identifier; forwards the first message to the powered element, where the powered element performs a command identified in the first message; and injects a second message via a second modulated communication signal onto the at least one branch circuit using the element-side PLC coupler. In the illustrative embodiment the second message is received from the powered element, the at least one hub-side PLC coupler associated with the controller hub detects the second message and sends an interrupt to the controller hub, the controller hub receives the interrupt from the hub-side PLC coupler, extracts the second message using the hub-side PLC coupler, reads a destination identifier in the second message, compares the destination identifier in the second message to a controller hub identifier in the controller hub, and responsive to the destination identifier in the second message matching the controller hub identifier, sends an acknowledgement message back to powered element, and the controller hub performs a command identified in the second message. In the illustrative embodiment, the second message is a request for an increase in power by the powered element. In the illustrative embodiment, responsive to the request for the increase in power, the illustrative embodiment verifies that the requested increase in power is below a maximum power available for the powered element and, responsive to the mini-controller determining that the requested increase in power is below the maximum power that is available for the powered element, forwards the second message to the controller hub. In the illustrative embodiment, upon receiving the second message, the controller hub verifies that the requested increase in power does not violate a branch circuit rating of the associated branch circuit. In the illustrative embodiment, responsive to the controller hub verifying that the branch circuit rating of the associated branch circuit has not been violated, the controller hub forwards the request upstream to a power supplying device controller associated with a power supplying device, in the illustrative embodiment, upon receiving the second message, the power supplying device controller determines whether the power supply device can provide the requested increase in power. In the illustrative embodiment, responsive to the power supply device being capable of supplying the requested increase in power, the power supplying device increases power. In the illustrative embodiment, the power supplying device controller sends a response message back to the powered element. In the illustrative embodiment, the powered element increases its power cap in order to operate at the requested increase in power.

In other illustrative embodiments, a computer program product comprising a computer useable or readable medium having a computer readable program is provided. The computer readable program, when executed on a computing device, causes the computing device to perform various ones of and combinations of, the operations outlined above with regard to the method illustrative embodiment.

In yet another illustrative embodiment, a communication system is provided. The communication system may comprise a controller hub, a hub-side power line communication (PLC) coupler, an element-side power line communication (PLC) coupler, and a mini-controller inside a powered element. The elements within the communication system perform various ones of, and combinations of, the operations outlined above with regard to the method illustrative embodiment.

These and other features and advantages of the present invention will be described in or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

This illustrative embodiment provides a power line communications platform that significantly simplifies the data center level power management and creates an independent low-level path to power measurement and allocation information. That is, the illustrative embodiments provide a mechanism for direct communication channels between and/or to powered IT equipment. The powered IT equipment may be a server unit, a storage unit, a network unit, or the like. In the illustrative embodiments, a communication infrastructure is provided that leverages a data center's power distribution system as a routing mechanism for at least the power related maintenance communications. That is, communications for power related communications is established over the power distribution lines (branch circuits) between the powered IT equipment in the data center and the power distribution equipment and over the power mains lines (feeder circuits) between the power distribution equipment and the power supplying devices, such as power plant, backup generator, uninterruptable power supplies, or the like. Since all powered IT equipment in a data center are coupled to power distribution equipment, the power distribution lines to the powered IT equipment provide an ideal medium to communicate power related maintenance communication to and from the powered IT equipment.

Figure 1:
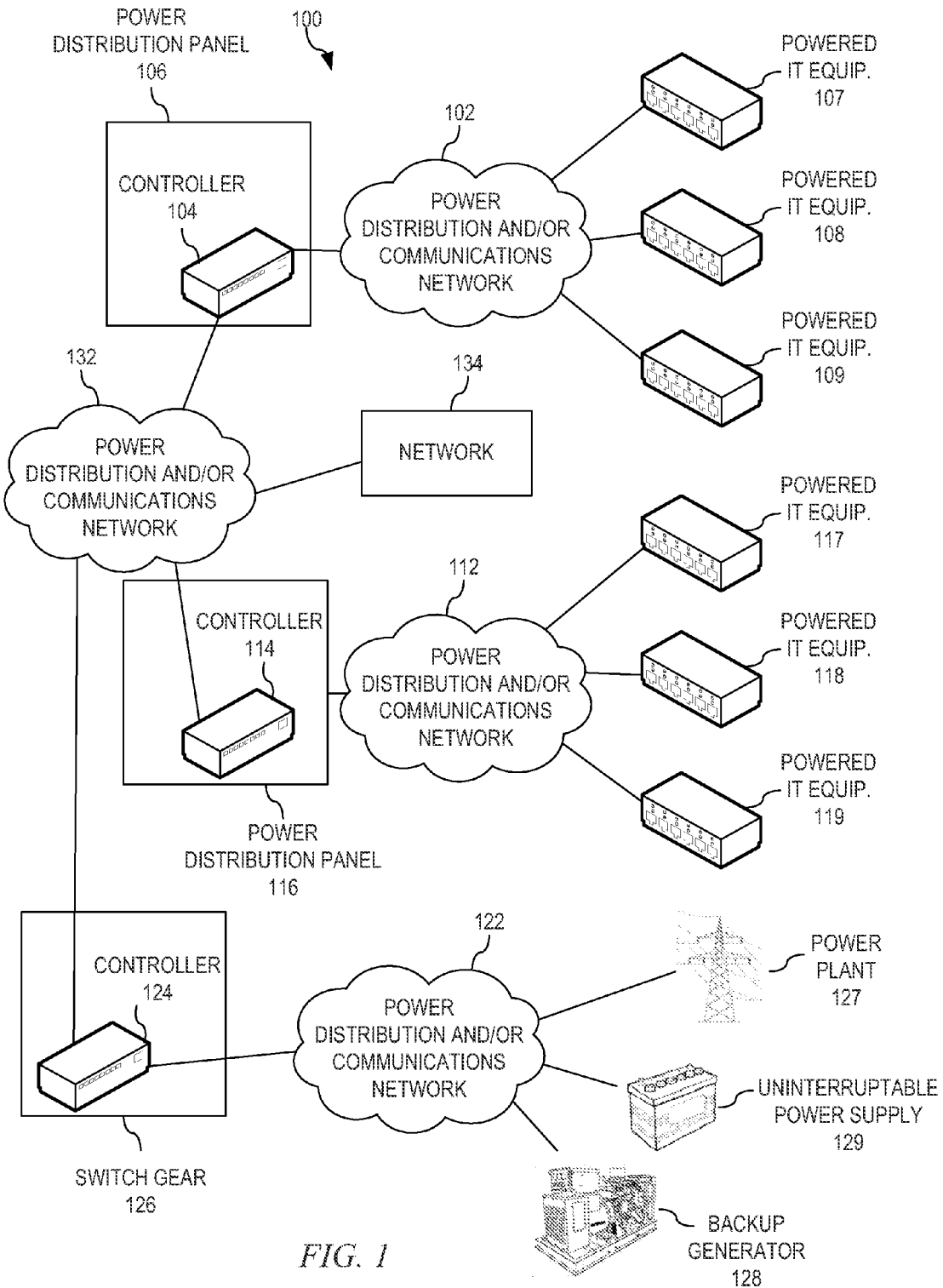
FIG. 1 is a representation of an exemplary distributed data processing system in which aspects of the illustrative embodiments may be implemented.
Figure 2:
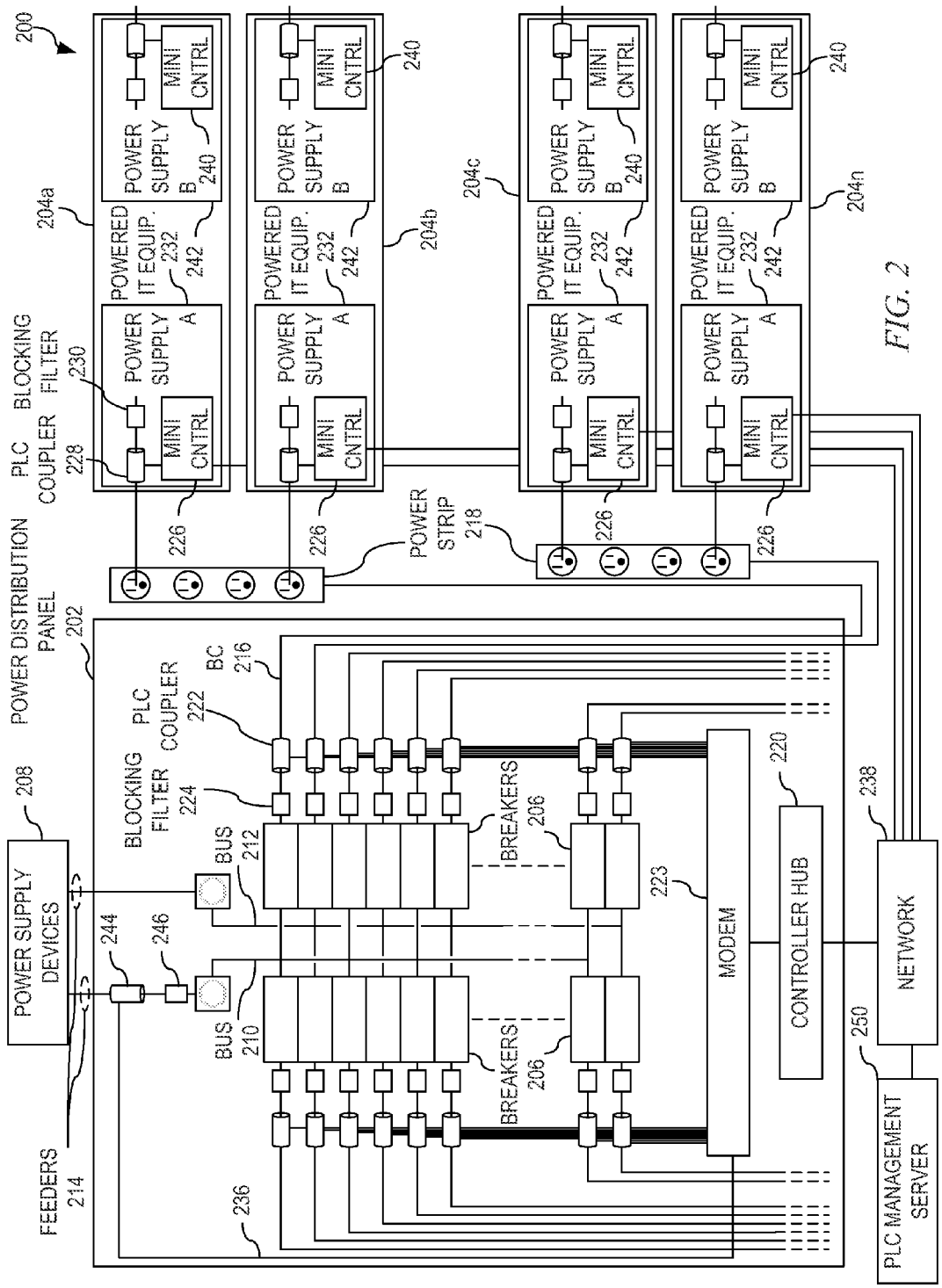
FIG. 2 depicts a representation of an exemplary network established between a power distribution device and a powered IT equipment in accordance with an illustrative embodiment.

With reference now to the figures and in particular with reference to FIGS. 1 and 2, exemplary diagrams of data processing environments are provided in which illustrative embodiments of the present invention may be implemented. It should be appreciated that FIGS. 1 and 2 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 is a representation of an exemplary distributed data processing system in which aspects of the illustrative embodiments may be implemented. Distributed data processing system 100 may include a network of data processing systems in which aspects of the illustrative embodiments may be implemented. Distributed data processing system 100 may also be referred to as a network node, which is a grouping of one or more network elements, at one or more sites, which provides network related functions, and is administered as a single entity. A single site may contain more than one network node. Exemplary distributed data processing system 100 comprises power distribution and/or communications networks 102, 112, 122 and 132, which are power line mediums used to distribute power to the various powered IT equipment coupled together within distributed data processing system 100 over which communication signals may also be sent.

In the depicted example, controller 104 residing in or substantially close to power distribution panel 106 may be connected to power distribution and/or communications network 102. The controller 104 may also be connected to a general network, e.g., Ethernet, wireless, Bluetooth, Infrared, or the like, which makes controller 104 remotely accessible by other systems connected to the same network. Each of powered IT equipment 107, 108, and 109 may be connected to power distribution and/or communications network 102 and may each comprise a mini-controller (not shown) for communicating with controller 104. Powered IT equipment 107, 108, and 109 may be servers, computers, routers, switches, modular storage elements, controllers, printers, serial attached SCSI hard disk drive (SAS HDD), or the like. Each of powered IT equipment 107, 108, and 109 may have an identifier (ID), such as a unique network address, sometimes called a data link control (PLC) address, media access control (MAC) address, identification number (ID), or the like.

The identifier may be part of vital product data (VPD) of powered IT equipment 107, 108, and 109. VPD is information provided in association with powered IT equipment 107, 108, and 109 and which may be loaded into controller 104 when powered IT equipment 107, 108, and 109 are initiated in distributed data processing system 100, for example. VPD information may also be provided separately from powered IT equipment 107, 108, and 109, and may be loaded manually into controller 104. The identifier allows powered IT equipment 107, 108, and 109 to be administered at a system or network level by controller 104. Vital product data may include element model number, a unique serial number, product release level, maintenance level, address, or other information specific to the device type. Vital product data may also include user-defined information, such as the building, room, row, rack, shelf, or the like for each of powered IT equipment 107, 108, and 109. The collection and use of vital product data allows the status of a network or computer system to be understood and service provided more quickly.

Similar to controller 104, controller 114 may reside in or substantially close to power distribution panel 116 and may be connected to power distribution and/or communications network 112. Each of powered IT equipment 117, 118, and 119 may also be connected to power distribution and/or communications network 112 and may each comprise a mini-controller (not shown) for communicating with controller 114. Powered IT equipment 117, 118, and 119 may also be servers, computers, routers, switches, modular storage elements, controllers, printers, serial attached SCSI hard disk drive (SAS HDD), or the like. Each of powered. IT equipment 117, 118, and 119 may also have an identifier (ID), such as a unique network address, sometimes called a data link control (DLC) address, media access control (MAC) address, identification number (ID), or the like.

While not illustrated in FIG. 1, each of powered IT equipment 107, 108, 109, 117, 118, and 119 may be powered by both an A-side power supply (represented by power distribution and/or communications networks 102 and 112, respectively) and a B-side power supply (not shown). Thus, each of powered IT equipment 107, 108, 109, 117, 118, and 119 may comprise two mini-controllers for communicating with an A-side controller (represented by controller 104 and 114, respectively) and a B-side controller (not shown). A mini-controller may be physically located in the powered IT equipment, in each of the IT equipment's power supplies, or in the power strip feeding the IT with power. A mini-controller may control communications related to one or more of the power supplies feeding a single powered IT equipment. The mini-controller may also control communications to and from multiple IT equipment. A controller, whether it be a controller such as controller 104, 114, or 124, or a mini-controller may further be connected to a general network, e.g., Ethernet, wireless, Bluetooth, Infrared, or the like, which makes the controller remotely accessible by other systems connected to the same network. The controller may utilize the network to publish received data through a network, such as that created by distributed data processing system 100, to other devices or computers connected to the network. The controller may also receive data from the network, and send it to another controller over the network. The controller receives commands sent through the network that direct the controller to communicate in a specific way over the network. One example for such commands is a "send PLC message", to which the controller responds by sending encoded data through the network. Another example is a "receive PLC message", to which the controller may respond by returning data received from the PLC network.

Exemplary distributed data processing system 100 may also comprise power distribution and/or communications network 122, which is a medium used to supply power from various power supplying devices and power distribution devices coupled together within distributed data processing system 100 over which communication signals may also be sent. In the depicted example, controller 124 may reside in or substantially close to switch gear 126 and may be coupled to power distribution and/or communications network 122. Each of power supplying devices 127, 128, and 129 may be connected to power distribution and/or communications network 122 and may each comprise a mini-controller (not shown) for communicating with controller 124. Power supplying devices 127, 128, and 129 may be power plant 127, backup generator 128, uninterruptable power supply 129, or other power supplying device that may provide power to a data center. Each of power supplying devices 127, 128, and 129 may have an identifier (ID) in order for communications to be made between controller 124 and power supplying devices 127, 128, and 129. It will be appreciated by one skilled in the art that more generally, powered IT equipment may have one or more power supplies, each may be connected to a different branch circuit by a power line communications coupler. These power line communication couplers may be controlled by one or more mini-controllers to perform the power line communications tasks. The IT equipment may have one or more identifiers (IDs).

In the depicted example, controllers 104 and 114 may be coupled to controller 124 via power distribution and/or communications network 132. Power distribution and/or communications network 132 may be a compilation of mediums such as power distribution lines between switch gear 126 and power panels 106 and 116 commonly referred to as feeders or sub-feeders within distributed data processing system 100 over which communication signals may also be sent or a communication medium, such as, for example, an Internet, an intranet, a local area network (LAN), a wide area network (WAN), an Ethernet, or the like, and thus may include connections, for example, wired links, wireless communication links, fiber optic cables, or the like.

The communication medium of power distribution and/or communications network 132 may be used by controllers 104 and 114 to communication information about powered IT equipment 107, 108, and 109 and 117, 118, and 119, respectively to controller 124, which may relay the information to power supplying devices 127, 128, and 129. Conversely, controller 124 may use the power line medium of network 132 to communicate information from power supplying devices 127, 128, and 129 to controllers 104 and 114, which may be relayed to powered IT equipment 107, 108, 109, 117, 118, and 119. The communication medium of power distribution and/or communications network 132 may be used by network 134 to communicate data, such as updated configurations, power measurements, power allocations, alarms, error analysis, and other management messages to controllers 104, 114, and 124 and onto the various powered IT equipment and power supplying devices coupled to those controllers.

As stated above, FIG. 1 is intended as an example, not as an architectural limitation for different embodiments of the present invention, and therefore, the particular powered IT equipment and power-supplying devices shown in FIG. 1 should not be considered limiting with regard to the environments in which the illustrative embodiments of the present invention may be implemented. As an example, one skilled in the art will appreciate that multiple levels of power distribution devices (e.g., power distribution panel, power distribution unit, transformers, power rectifiers, or the like) may exist between the power supplying devices and the powered IT equipment. In such a case, each power distribution device at all levels of the power distribution hierarchy will have a controller hub similar to 104, 114, and 124. In such a case also, the communication path between the power IT equipment and the power supplying devices may traverse the power distribution network, where it has to pass through the corresponding number of power distribution devices between the source and destination of communications.

As described above, distributed data processing system 100, which may also be referred to as a power line communications (PLC) system or unit, enables a controller to communicate over the power lines. A PLC unit has at least three components: a controller (for example, a controller hub or mini-controller), a PLC modem, and a PLC coupler. Additionally, the PLC system may have a band pass filter (BPF) and/or a PLC blocking filter.

A PLC modem performs the functionalities of a PLC modulator and a PLC demodulator. A PLC modulator modulates the power line communications carrier signal with a frequency that may be in a range of 100 s of kHz to 100 s of MHz. Data sent by the controller using the modulated PLC signal may be referred to as a "PLC message". The PLC modem is coupled to a PLC coupler, where each PLC coupler interfaces the modem to at least one power line. The PLC modem may have a memory storage space (registers, RAM, FLASH memory, or disk space as examples) in which the PLC modem may store tuples of the received data and an identifier that uniquely identify the power line it was received from.

The PLC coupler may detect PLC signals on the power line to which the PLC coupler is coupled, which may be referred to as a PLC: coupling point. The PLC modem receives the PLC signal, demodulates the PLC signal, and extracts the data encoded in the PLC signal. Each power line in the PLC network has a unique identifier that identifies the power line. This should not be confused with the unique identifiers assigned to devices connected to these power lines. PLC messages sent over the PLC network each originate at a certain device (source identifier) in the PLC network and arrive at another device (destination identifier) in the PLC network.

A PLC coupler may be an inductive coupler, a coil surrounding the power line, which injects the PLC signal without physical electrical contact with the power line. An inductive PLC coupler may be physically installed on the power line that feeds IT equipment, and the PLC coupler may be driven by a PLC modem that receives data from IT equipment via a data port like a serial port, a USB port, a Firewire port, or the like. Alternatively, the PLC coupler may be a capacitive coupler, which is physically coupled by electrical wiring to the power line. A capacitive PLC coupler may be physically located inside the power supply of the powered IT equipment, which enables the IT equipment to send PLC signals over the power lines. A capacitive coupler may alternatively be located in the power strip powering the IT equipment, in which case a single PLC coupler may be utilized by multiple IT equipments, given that they are all connected to the same power strip containing the PLC coupler. An intelligent power distribution unit (iPDU) may house the PLC coupler and associated PLC modem. An iPDU is a smart power strip that is capable to communicate over an Ethernet network, and may also monitor temperature, humidity, and other environmentals.

When the PLC modem receives a query from the controller, checking for the existence of PLC received data by the PLC modem, the modem sends back a string of at least one tuple of PLC message data received and corresponding power lines identifiers. If no data exists, a "no data exists" response may be retrieved from the PLC modem as the PLC message data. Alternatively, the PLC modem may raise an interrupt to the controller, where the interrupt handler running on the controller reads the tuples of data stored in the PLC modem's storage space and corresponding power line identifiers.

The unique identifier of a power line (branch circuit or feeder) inside the power distribution panel may simply be an integer "power line number" in the range of 1-to-N, where N is the total number of feeder (upstream) and branch circuit (downstream) power lines connected to the power distribution device. This identifier is unique inside a power panel and uniquely identifies a power line by the controller or the modem. A global unique power line identifier may be obtained by concatenating a unique power distribution device identifier (e.g., PP126) to the power line number.

A PLC coupler may also inject PLC message into the power line to which the PLC coupler is coupled. When the controller sends data to the PLC modem that needs to be transmitted over a specific power line, the modem modulates the PLC carrier by the controller data, and applies the modulated carrier (the PLC signal) to the PLC coupler coupled to that specific carrier.

The PLC modem may be a stand-alone unit, may be integrated within the PLC couplers or it may be integrated within the controller. The controller, combined with the PLC system (PLC modem and the PLC coupler), may be all integrated in a single unit to send and receive PLC signals over a power line. One controller may control one or more one PLC modem, and a PLC modem may be connected to one or more PLC coupler, and one PLC coupler may be connected to one or more power lines.

The PLC modem in the power distribution device is capable of performing full-duplex PLC, which means that the controller is capable of two way communications, sending and receiving PLC signals over the power lines. Alternatively, the PLC modem may be replaced by a PLC demodulator or by a PLC modulator. Replacing the PLC modem by either a PLC modulator or a PLC demodulator limits PLC to half-duplex mode, in which PLC signals may only be sent or received, respectively.

A PLC demodulator receives PLC messages from the PLC coupler, demodulates the PLC message, and extracts data however the PLC demodulator does not send PLC messages. The data extracted from the PLC coupler may be polled by the controller, which would periodically probe the demodulator to check for the presence of received data. Alternatively, the demodulator may send an interrupt to the controller. In an interrupt mode, the controller probes the PLC modem for information, only when the controller receives an interrupt signal.

A PLC modulator is capable of sending messages by modulating the PLC carrier using the data to be sent, where PLC message is then injected to the power line via a PLC coupler coupled to the power line. When the controller has data to be sent over the PLC network, the controller sends this data to the PLC modulator.

A BPF captures the PLC messages, which are modulated by the carrier frequency. This increases the reliability of the PLC system by reducing noise from frequency outside the communications frequency band. A PLC blocking filter on the other hand acts like a low pass filter (LPF), where PLC signals are blocked, and prevented from passing the blocking filter to other segments of the PLC network.

FIG. 2 depicts a representation of an exemplary network established between a power distribution device and powered IT equipment in accordance with an illustrative embodiment. Distributed data processing system 200 comprises power distribution panel 202, such as power distribution panels 106 and 116 of FIG. 1, and powered IT equipment 204a, 204b, 204c, and 204n, such as powered IT equipment 107, 108, or 109 of FIG. 1. Power distribution panel 202 comprises breakers 206 coupled to power supply device 208 via buses 210 and 212 and feeder 214. The exemplary configuration of breakers 206 and buses 210 and 212 represents a single phase 220-volt distribution panel; however, the illustrative embodiments are not limited to only the exemplary configuration. That is, the illustrative embodiment may be implemented in other power distribution devices, such as a 3 phase 208-volt power distribution panel, a 3 phase 480-volt power distribution panel, a switch gear system, a step up transformer, a step down transformer, a power rectifier, or the like, without departing from the spirit and scope of the invention.

In the depicted example, each of breakers 206 provides power from its associated one of bus 210 or 212 via its associated branch circuit 216 to one or more of powered IT equipment 204a, 204b, 204c, and 204n, which may be coupled to branch circuit 216 via power strip 218. In order to communicate with powered IT equipment 204a, 204b, 204c, and 204n, controller hub 220 uses power line communication (PLC) modem 223 as described above. Controller 220 and modem 223 are shown to reside within power distribution panel 202 but may also reside substantially close to power distribution panel 202 in an alternative embodiment. Using PLC modem 223, controller 220 injects a message via a modulated communication signal onto branch circuit 216 using PLC coupler 222. As described above, controller 220 and mini-controller 226 use a PLC modem, such as PLC modem 223, to pass data through a power line, such as branch circuits 216. However, in order to simplify the remaining description, the following actions are described as being performed by controller 220 and/or mini-controllers 226 without including the actions that are performed by the PLC modems as described above.

A PLC blocking filter 224 on each branch circuits 216 blocks the modulated communication signal from being transmitted to other ones of breakers 206 and onto other ones of branch circuits 216. The PLC blocking filter prevents PLC communications signals on a power line from spreading outside this power line to other power lines in the PLC network. This effectively creates a private communications channel between devices with PLC couplers coupled to the power line. This, in turn, allows the PLC system to associate locality and presence of source devices that send PLC messages with power lines over which these messages are sent.

PLC blocking filter 224 may be a programmable PLC blocking filter, where the blocking functionality of the filter may be turned off using control logic from the controller. In a default state, PLC blocking filter 224 acts as a low pass filter, where are the communications signals passing through the blocking filter are blocked off. When a control signal is applied to the PLC blocking filter, the blocking functionality is disabled, and the PLC signals can pass through the filter.

Each message sent by controller hub 220 comprises a sender identifier, a destination identifier, a command, and any data associated with the command. The destination identifier may indicate a broadcast message, which will result in a match with all destinations when any receiver makes identifier comparison, whether it is located in the same level, upstream, or downstream from the sender, as indicated by its identifier. A destination identifier may indicate a generic upstream target, which will result in a match when identifier comparison is made in an upstream message, but will result in a mismatch at downstream or same level communications on a shared branch circuit. A destination identifier may indicate a generic downstream target, which will result in a match when identifier comparison is made in a downstream message, but will result in a mismatch at upstream or same level communications on a shared branch circuit.

The message travels along branch circuit 216 to coupled powered IT equipment, for example, powered IT equipment 204a and powered IT equipment 204b. Power line communication coupler 228 detects the message and sends an interrupt to mini-controller 226. Mini-controller 226 in each of powered IT equipment 204a and 204b receives the interrupt and extracts the message using power line communication coupler 228. Blocking filter 230 on branch circuit 216 blocks the modulated communication signal from being transmitted to power supply A 232. Since controller hub 220 may send the message to more than one powered IT equipment coupled to branch circuit 216, in this example powered IT equipment 204a and 204b, each mini-controller 226 in the powered IT equipment reads the destination identifier in the message and compares the destination identifier to its own identifier.

If there is a match between the identifiers, the corresponding powered IT equipment 204a or 204b sends an acknowledgement message back to controller hub 220 and executes the command identified in the message. In the depicted example, powered IT equipment 204a, 204b, 204c, and 204n may perform any command sent by controller hub 220 such as gathering and returning alarm information, responding to power allocation/budget increase/decrease requests, workload migration instructions, or the like, and inject a response message onto branch circuit 216 using power line communication coupler 228. Power line communication coupler 222 detects the message and sends an interrupt to controller hub 220. Controller hub 220 receives the interrupt and extracts the message using power line communication coupler 222. Controller hub 220 extracts the response message and performs any necessary actions. If there is no match between the identifiers, mini-controller 226 ignores any command associated with the message.

Alternatively, if mini-controller 226 sends a message to controller hub 220 or to a controller coupled via controller hub 220, mini-controller 226 injects the message via a modulated communication signal onto branch circuit 216 via power line communication coupler 228, and mini-controller also inserts its identifier into the message as a sender identifier. Blocking fitter 230 blocks the modulated communication signal from being transmitted to power supply A 232. The message travels along branch circuit 216 to power distribution panel 202. Power line communication coupler 222 detects the message and sends an interrupt to controller hub 220. Controller hub 220 receives the interrupt and extracts the message using power line communication coupler 222. Blocking filter 224 on branch circuit 216 again blocks the modulated communication signal from being transmitted to other ones of breakers 206 and onto other ones of branch circuits 216. Controller hub 220 reads the destination identifier in the message and compares the destination identifier to its own identifier.

If there is a match between the identifiers, controller hub 220 sends an acknowledgement message back to mini-controller 226, using the sender identifier in the original message as a destination identifier in the acknowledgement response, and executes the command identified in the message. In the depicted example, controller hub 220 may perform any command sent by mini-controller 226 such as gathering and returning alarm information, responding to power budget (i.e., allocation) increase/decrease requests, workload migration instructions, or the like, and inject a response message onto branch circuit 216 using power line communication coupler 222. Power line communication coupler 228 detects the message and sends an interrupt to mini-controller 226. Mini-controller 226 in each of powered IT equipment 204a and 204b receives the interrupt and extracts the message using power line communication coupler 228. Mini-controller 226 then performs any necessary actions. If there is no match between the identifiers, controller hub 220 ignores any command in the message but forwards the message either upstream via a power supply-side power line coupler 244 or downstream to another mini-controller another powered IT equipment via a branch circuit PLC coupler 222.

Controller hub 220 may also be coupled directly to feeders 214 via connection 236. In order to forward the message upstream, controller hub 220 injects a message via a modulated communication signal onto feeder 214 using power line communication (PLC) coupler 244. Blocking filter 246 on feeder 214 blocks the modulated communication signal from being transmitted onto bus 210 and, thus, onto breakers 206.

As previously discussed in FIG. 1, each of powered IT equipment 204a, 204b, 204c, and 204n may be powered by both an A-side power distribution panel (represented by power distribution panel 202) and a B-side power distribution panel (not shown). Thus, each of powered IT equipment 204a, 204b, 204c, and 204n may comprise mini-controller 226 in power supply A 232 and mini-controller 240 in power supply B 242. Additionally, controller hub 220 and each of mini-controllers 226 may receive additional instructions via network 238.

The additional instructions may be sent from PLC management server 250 connected to the network 238. PLC management server 250 may send commands to controller hub 220 and/or mini-controllers 226, send and receive data to controller hub 220 and/or mini-controllers 226, receive status information from controller hub 220 and/or mini-controllers 226, or send configuration information to controller hub 220 and/or mini-controllers 226.

Commands sent by PLC management server 250 to mini-controller 226 may, for example, include a "send PLC message" and/or a "receive PLC message". Both the "send PLC message" and the "receive PLC message" command cause mini-controller 226 to communicate over the power line (branch circuit 216), to which mini-controller 226 and any associated communications unit are connected.

Commands sent by PLC management server 250 to controller hub 220 may, for example, include a "send PLC message" and/or a "receive PLC message". Both the "send PLC message" and the "receive PLC message" command may specify one of the power line lines (feeder lines 214 or branch circuits 216) connected to the power distribution panel 202 via a unique identifier to send and receive data, respectively.

The "send PLC message" command to a specific power line enables all devices to listen to the sent PLC message. The "send PLC message" command may include the data to be sent by the controller hub over the specified power line in the command body or in a separate string that follows the command code.

Controller hub 220 responds to the "receive PLC message" command by probing PLC modem 223 (or PLC demodulator) and/or PLC coupler 222 connected to the specified power line. If controller hub 220 receives data from PLC modem 223 in response to the PLC modem probe, controller hub 220 sends this data back to PLC management server 250.

PLC management server 250 may configure the controller hub 220 and min-controllers 226 by assigning a unique ID to each of them. The management server may probe the status of mini-controllers 226 and controller hub 220 by a "check device status" command, a command that encodes the device unique identifier as a "destination identifier" field, where mini-controllers 226 and controller hub 220 may each respond with their corresponding unique ID along with status code. Status codes may include "busy", "available", "data available", and "buffer full". The "destination identifier" field may encode one or more of a unique identifier, a broadcast identifier, a downstream identifier, an upstream message, or the like. A unique identifier specifies one power line in the plurality of upstream and downstream power lines. The controller sends the encoded data to the corresponding modem coupled to the unique power line identified in the "destination field". The modem then modulates the encoded data forming a PLC message and sends the PLC message over the unique power line via the PLC coupler coupled to the unique identified power line. A broadcast identifier is used by the controller to send the encoded data to the at least one modem coupled to all the upstream and downstream power lines coupled to PLC couplers located in the power distribution device. The modem modulates the encoded data forming a PLC message and sends the PLC message over all the upstream and downstream power lines via the PLC couplers coupled to the upstream and downstream power lines. A downstream identifier is used by the controller to send the encoded data to the at least one modem coupled to all the downstream power lines coupled to PLC couplers located in the power distribution device. The modem modulates the encoded data forming a PLC message and sends the PLC message over all the downstream power lines via the PLC couplers coupled to downstream power lines. An upstream message is used by the controller to send the encoded data to the at least one modem coupled to all the upstream power lines coupled to PLC couplers located in the power distribution device. The modem modulates the encoded data forming a PLC message and sends the PLC message over all the upstream power lines via the PLC couplers coupled to the upstream power lines.

The following are additional examples of how distributed data processing system 200 may operate in various situations. In a situation when, for example, powered IT equipment 204a requires the use of more power than has been allocated to powered IT equipment 204a, but is less than a maximum power that is available for powered IT equipment 204a to use, powered equipment 204a may initiate a request for an increase in power by sending the request to mini-controller 226. Prior to forwarding the request, mini-controller 226 may verify that the requested increase in power is below the maximum power available for powered IT equipment 204a. If mini-controller 226 determines that the requested increase in power is below the maximum power that is available for powered IT equipment 204a, then mini-controller 226 forwards the request as a message to controller hub 220 by injecting the message via a modulated communication signal onto branch circuit 216 via power line communication coupler 228. PLC blocking filter 230 again blocks the modulated communication signal from being transmitted to power supply A 232. The message travels along branch circuit 216 to power distribution panel 202. Power line communication coupler 222 detects the message and sends an interrupt to controller hub 220. Controller hub 220 receives the interrupt and extracts the message using power line communication coupler 222. Blocking filter 224 on branch circuit 216 blocks the modulated communication signal from being transmitted to other ones of breakers 206 and onto other ones of branch circuits 216. Controller hub 220 reads the destination identifier in the message and compares the destination identifier to its own identifier.

If controller hub 220 determines that the destination identifier matches its own identifier, then, prior to forwarding the request, controller hub 220 may verify that the requested increase in power budget does not violate the branch circuit rating of branch circuit 216 and of circuit breaker 206. In cases where multiple levels of power distribution devices exist between the powered IT equipment 204a and the power supplying devices, the budget increase request may be approved by all power distribution devices connecting the power supplying device to the powered IT equipment. Each of the power distribution and power supplying devices hold a table of allocated powers, and compares the total allocated power to its power rating, and make the decision to grant the requested power increase, only if this total allocated fits within the power distribution device rating. If the total power allocation, after satisfying the requested power budget increase, exceeds its own rating, the power allocation request will be denied, and the requesting IT equipment has to continue to operate within the available power budget.

If controller hub 220 verifies that the branch circuit rating of branch circuit 216 has not been violated, then controller hub 220 may forward the request upstream to a power supplying source, such as a power utility main, a backup generator, an uninterruptable power supply, or the like, via power line communication (PLC) coupler 244. In order to forward the message upstream, controller hub 220 injects the message via a modulated communication signal onto feeder 214 using power line communication (PLC) coupler 244. PLC blocking filter 246 on feeder 214 blocks the modulated communication signal from being transmitted onto bus 210 and, thus, onto breakers 206.

While not shown in FIG. 2 but as illustrated as a combination of FIG. 1 and FIG. 2, a power line communication coupler in a switch gear or other distribution device associated with the power supplying device detects the message and sends an interrupt to the controller associated with the power supplying device. The controller receives the interrupt and extracts the message using the power line communication coupler. A blocking filter on the other end of feeder 214 blocks the modulated communication signal from being transmitted into the power supply device. The controller reads the destination identifier in the message and compares the destination identifier to its own identifier. If the controller determines that the destination identifier matches its own identifier, then the controller determines whether the power supply device can provide the increase in power. If the controller determines that the increase in power can be supplied by the power supplying device, then the controller initiates an increase in power by signaling the power supplying device to increase power and sends a response message back to the powered IT equipment 204*a*. The controller injects the response message on the modulated communication signal on feeder 214 using a power line communication coupler. Again, the blocking filter on the other end of feeder 214 blocks the modulated communication signal from being transmitted into the power supply device.

Power line communication coupler 244 detects the message and sends an interrupt to controller hub 220. Controller hub 220 receives the interrupt and extracts the message using power line communication coupler 244. Blocking filter 246 on feeder 214 again blocks the modulated communication signal from being transmitted on to bus 210. Controller hub 220 reads the destination identifier in the response message and compares the destination identifier to its own identifier. Since the response message is for powered IT equipment 204 and mini-controller 226, then controller hub 220 forwards the response message downstream to mini-controller 226.

In this instance, the response message is sent to both powered IT equipment 204*a* and 204*b*. Both mini-controllers 226 in powered IT equipment 204*a* and 204*b* read the destination identifier in the response message and compare the destination identifier to its own identifier. Since the response message is intended only for powered IT equipment 204*a*, then only mini-controller 226 in powered IT equipment 204*a* will be able to match the identifiers, mini-controller in powered IT equipment 204*a* sends an acknowledgement message back to controller hub 220 and executes the command identified in the message. That is, mini-controller 226 in powered IT equipment 204*a*, sends the response message to powered IT equipment 204*a*, increases its power cap of power supply A 232, and powered IT equipment 204*a* operates at the high power usage level. A similar process may be performed using mini-controller 240 if a power increase is needed from the power supply B 242.

If, during the process, mini-controller 226 determines that the requested increase in power is above the maximum power that is available for powered IT equipment 204*a*, if controller hub 220 verifies that the branch circuit rating of branch circuit 216 has been violated, or if the controller associated with the power supplying device determines that the increase in power cannot be supplied by the power supplying device, then a response message is sent to powered IT equipment 204*a* indicating the request for the increase in power cannot be provided.

As an additional example, in a different situation when a power supplying device is able to provide an alarm that power will be lost at some pre-identified time, the illustrative embodiments also make use of the mechanism for direct communication channels between the powered IT equipment within a data center and maintenance systems maintaining the powered IT equipment. For example, if a power supplying device, such as a power utility provider, a backup generator, an uninterruptable power supply, or the like, is aware that power will not be able to be delivered for a specific time interval due to line maintenance, weather problems, or the like, or if power supplying device is a backup generator or uninterruptible power supply that is failing or has limited time left to operate, then a controller in a switch gear or other distribution device associated with the power supplying device injects an alarm message to all affected powered IT equipment 204*a*, 204*b*, 204*c*, and 204*n* on the modulated communication signal on feeder 214 using a power line communication coupler. Again, the blocking filter on the other end of feeder 214 blocks the modulated communication signal from being transmitted into the power supply device.

Power line communication coupler 244 detects the message and sends an interrupt to controller hub 220. Controller 220 receives the interrupt and extracts the alarm message using power line communication coupler 244. Blocking filter 246 on feeder 214 again blocks the modulated communication signal from being transmitted on to bus 210. Controller hub 220 reads the destination identifier in the alarm message and compares the destination identifier to its own identifier. Since the alarm message's destination id is for all downstream powered IT equipment, i.e., 204*a*, 204*b*, 204*c*, and 204*n* and mini-controllers 226, then controller hub 220 forwards the alarm message downstream to all mini-controllers 226.

In this instance, the alarm message is sent to powered equipment 204*a*, 204*b*, 204*c*, and 204*n*. Mini-controllers 226 in powered IT equipment 204*a*, 204*b*, 204*c*, and 204*n* read the destination identifier in the alarm message and compare the destination identifier to its own identifier. Since the alarm message is a downstream broadcast message, intended for all powered IT equipment 204*a*, 204*b*, 204*c*, and 204*n*, then each mini-controller 226 will be able to match the identifiers, mini-controller 226 in each of powered IT equipment 204*a*, 204*b*, 204*c*, and 204*n* sends an acknowledgement message back to controller hub 220 and informs its associated one of powered IT equipment 204*a*, 204*b*, 204*c*, and 204*n* of the alarm message. At this point, each powered IT equipment 204*a*, 204*b*, 204*c*, and 204*n*, may perform any number of operations based on the alarm, such as workload migration to a powered IT equipment not affected by the power issue, a workload decrease such that no additional work will be performed by the powered IT equipment, a switch over to a single power supply if both power supplies will not be affected, or the like.

Thus, a mechanism is provided for direct communication channels between the powered IT equipment within a data center. A communication infrastructure is provided for power related communications is established on the power distribution lines (branch circuits) between the powered IT equipment in the data center and the power distribution equipment, such as power distribution panels, transformers, power distribution units, rectifiers, automatic transfer switches, backup generator, uninterruptable power supplies, or the like.

Figure 3:
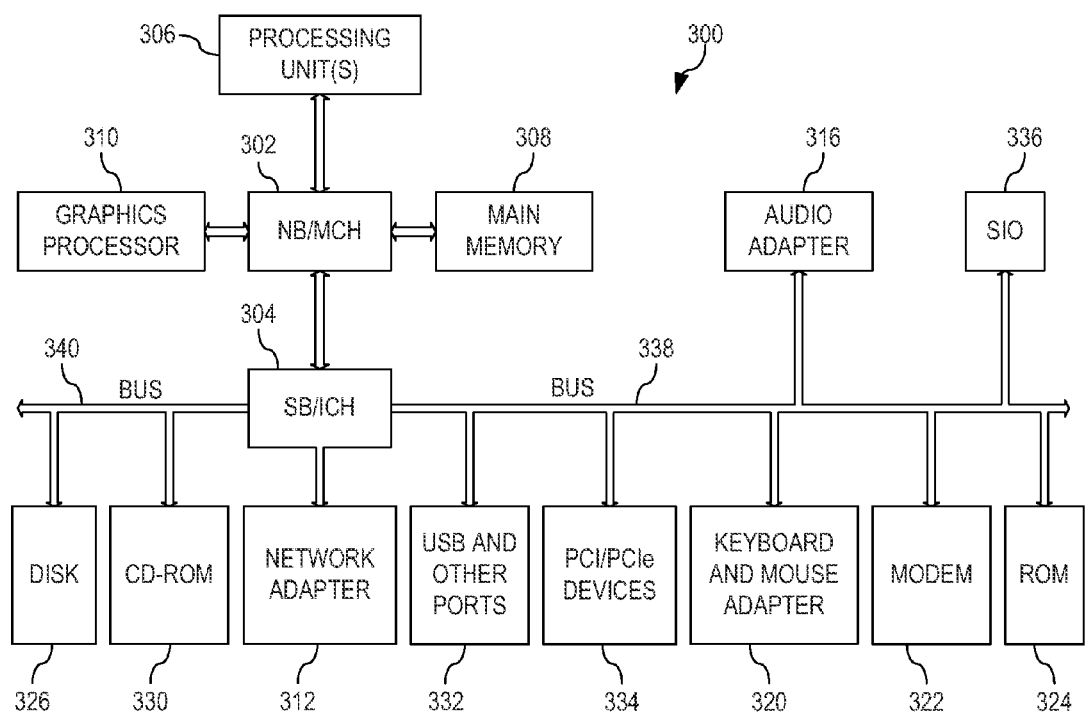
FIG. 3 shows a block diagram of an exemplary data processing system in which aspects of the illustrative embodiments may be implemented.

With reference now to FIG. 3, a block diagram of an exemplary data processing system is shown in which aspects of the illustrative embodiments may be implemented. Data processing system 300 is an example of a controller or powered IT equipment, such as controller hub 220, mini-controller 226, or powered IT equipment 204*a*, 204*b*, 204*c*, and 204*n* of FIG. 2, in which computer usable code or instructions implementing the processes for illustrative embodiments of the present invention may be located.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash binary input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306. The operating system coordinates and provides control of various components within the data processing system 300 in FIG. 3. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 300 (Java is a trademark of Sun Microsystems, Inc. in the United States, other countries, or both).

As a server, data processing system 300 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device which is configured with flash memory to provide non-volatile memory for storing operating system files and/or user-generated data, for example. Essentially, data processing system 300 may be any known or later developed data processing system without architectural limitation.

Data processing system 300 operating as a programming server/client provides communication data, such as boot files, updated configurations, operating system images, error analysis, and applications to the powered IT equipment through power-line connections or networks, such as for example, an Internet, an intranet, a local area network (LAN), a wide area network (WAN), or the like. Data processing system 300 operating as a controller injects communication data onto a network through network adapter 312. The network provides power and communication data to powered IT equipment Data processing system 300 operating as a powered IT equipment determines if the communication data should be used for configuration using an address embedded within the communication data.

As will be appreciated by one skilled in the art, the present invention may be embodied as a system, method, or computer program product. Accordingly, aspects of the present invention may take the form of an entirely hardware embodiment, an entirety software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Referring now to FIGS. 4-7, these figures provide flowcharts outlining example operations of communicating power related communications over the power distribution lines (branch circuits) between the powered IT equipment in the data center and the power distribution equipment, such as power distribution panels, backup generator, uninterruptable power supplies, transformers, power distribution units, rectifiers, automatic transfer switches, or the like.

Figure 4:
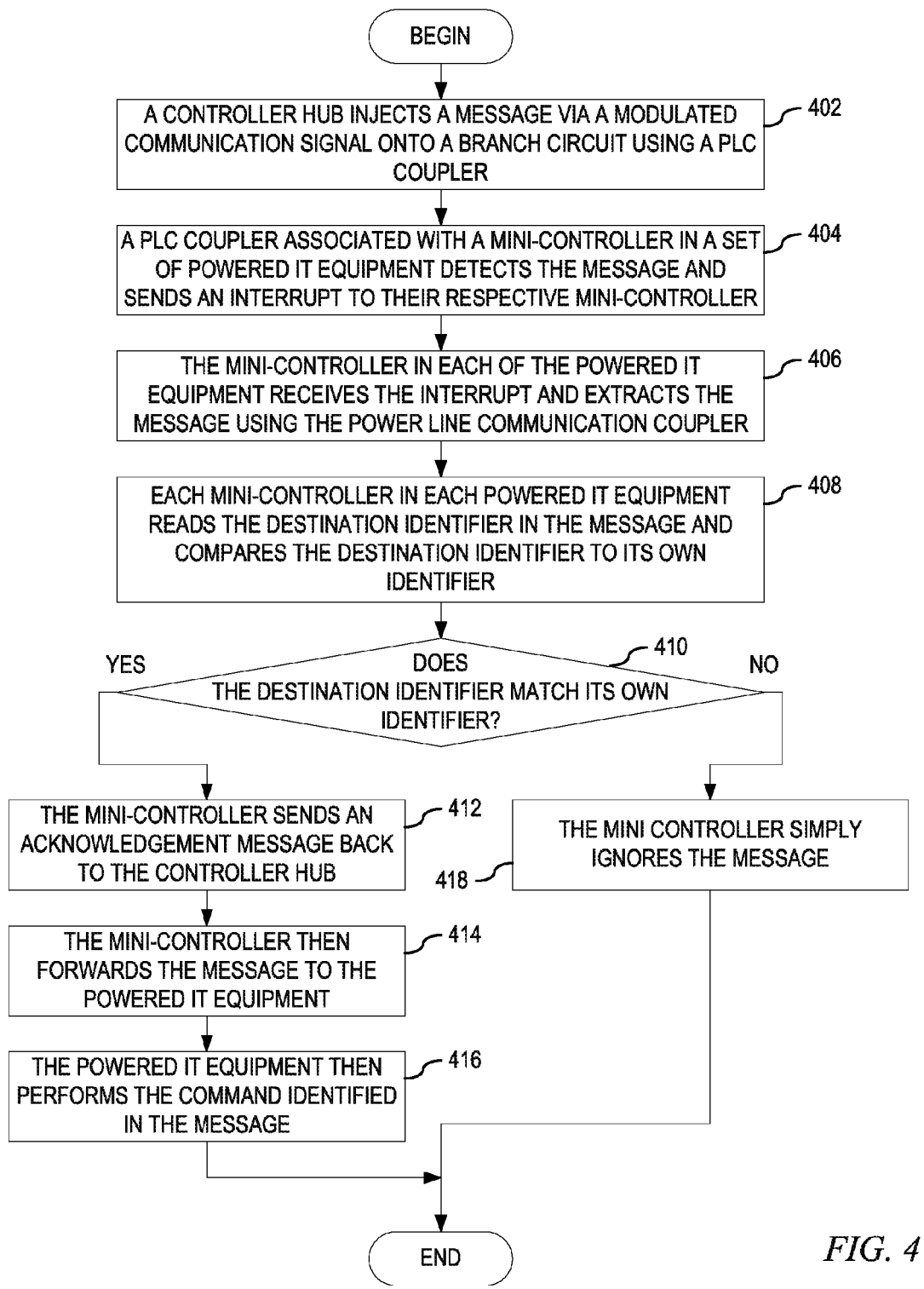
FIG. 4 depicts an exemplary operation performed in sending a message between a controller hub and powered IT equipment in accordance with an illustrative embodiment.

FIG. 4 depicts an exemplary operation performed in sending a message between a controller hub and powered IT equipment in accordance with an illustrative embodiment. While the following operation is described from the viewpoint of a controller hub sending a message to a powered IT equipment, a similar operation may performed by the controller sending a message to a downstream device, such as another controller in a lower level of the power distribution hierarchy.

As the operation begins, a controller hub, which may reside within a power distribution panel or substantially close to the power distribution panel, injects a message via a modulated communication signal onto a branch circuit using a power line communication (PLC) coupler (step 402). Each power line communication coupler associated with a mini-controller in a set of powered IT equipment connected to the branch circuit linked to the communication coupler detects the message and sends an interrupt to their respective mini-controller (step 404). Each mini-controller in each of the powered IT equipment on the coupled branch circuit receives the interrupt and extracts the message using the power line communication coupler (step 406). Each mini-controller in each powered IT equipment reads the destination identifier in the message and compares the destination identifier to its own identifier (step 408). The mini-controller then determines if the destination identifier matches its own identifier (step 410).

If at step 410 there is a match between the identifiers, the mini-controller sends an acknowledgement message back to the controller hub (step 412). The mini-controller then forwards the message to the powered IT equipment (step 414). The powered IT equipment then performs the command identified in the message (step 416), with the operation ending thereafter. If a response message is required, then the powered IT equipment sends a response message via the flow that will be described in FIG. 5. If at step 410 there is not a match between the identifiers, then the mini-controller simply ignores the message (step 418), with the operation ending thereafter.

Figure 5:
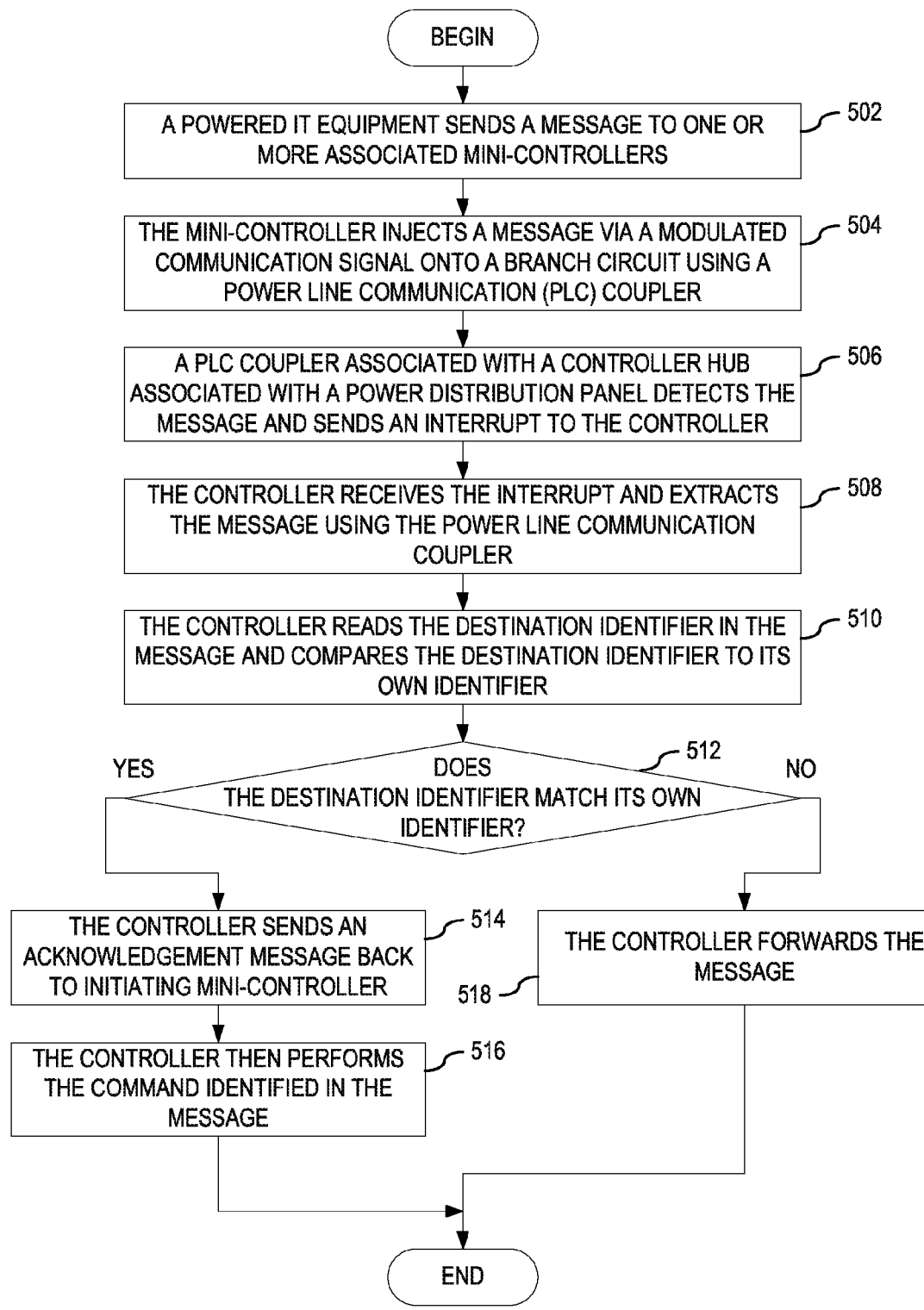
FIG. 5 depicts an exemplary operation performed in sending a message between a powered IT equipment and a controller hub associated with an upstream device, such as a power supplying device, in accordance with an illustrative embodiment.

FIG. 5 depicts an exemplary operation performed in sending a message between a powered IT equipment and a controller hub associated with an upstream device, such as a power supplying device, in accordance with an illustrative embodiment. As the operation begins, in response to a command performed at the request of a controller hub or other controller or the powered IT equipment is requesting a service, a powered IT equipment sends a message, either response or new, to one or more associated mini-controllers (step 502). The mini-controller injects a message via a modulated communication signal onto a branch circuit using a power line communication (PLC) coupler (step 504). A power line communication coupler associated with a controller hub associated with a power distribution panel detects the message and sends an interrupt to the controller hub (step 506). The controller hub receives the interrupt and extracts the message using the power line communication coupler (step 508). The controller hub reads the destination identifier in the message and compares the destination identifier to its own identifier (step 510). The controller hub then determines if the destination identifier matches its own identifier (step 512).

If at step 512 there is a match between the identifiers, the controller hub sends an acknowledgement message back to initiating mini-controller as is described in FIG. 4 (step 514). The controller hub then performs the command identified in the message (step 516), with the operation ending thereafter. If at step 512 the message is not intended for the controller hub but for an upstream or downstream controller hub, then the controller hub forwards the message as is described in FIG. 4 (step 518) with the operation ending thereafter.

Figure 6A:
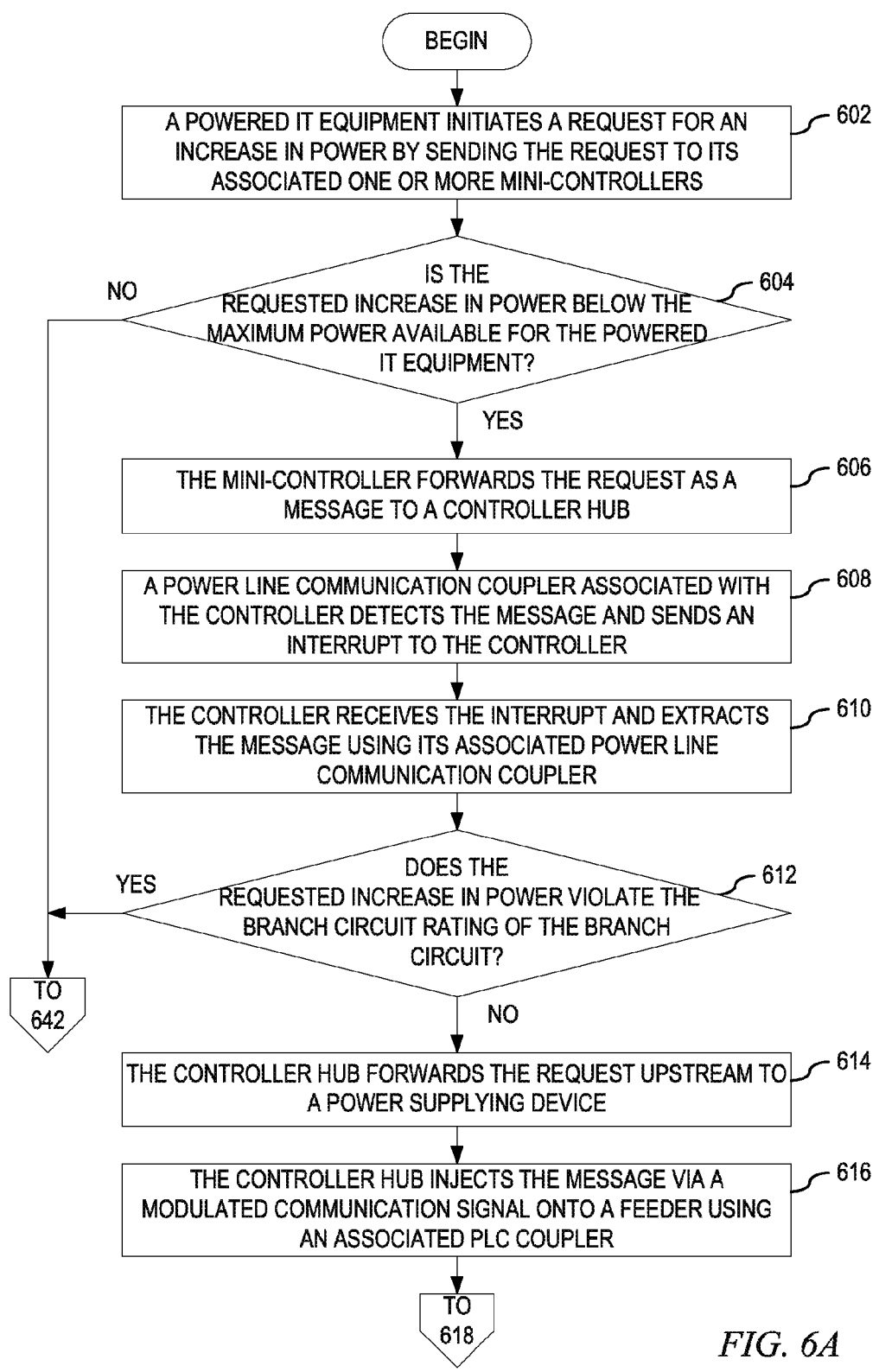
FIGS. 6A-6C depict an exemplary operation performed in requesting an increase in power allocated to powered IT equipment in accordance with an illustrative embodiment.
Figure 6B:
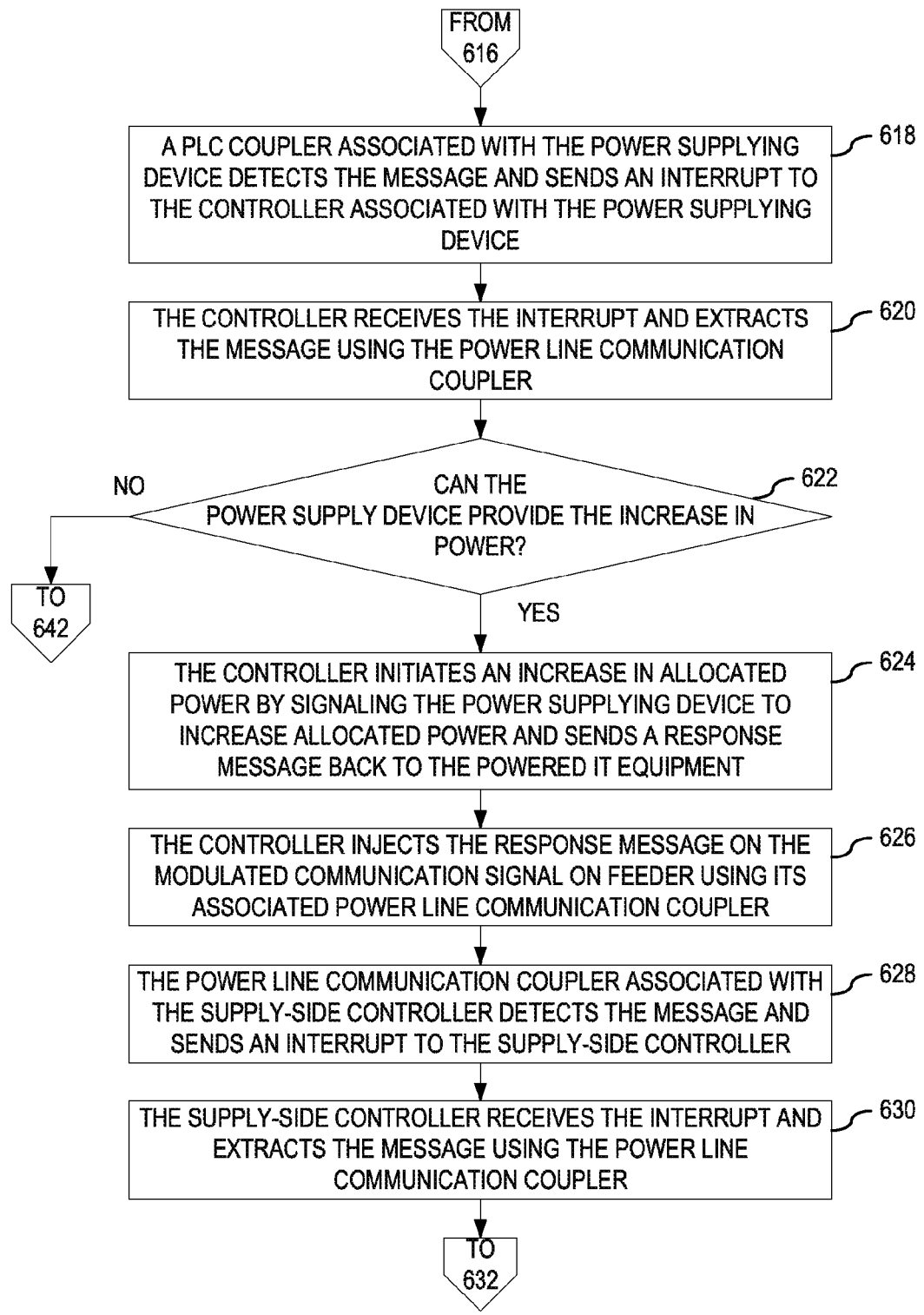
Figure 6C:
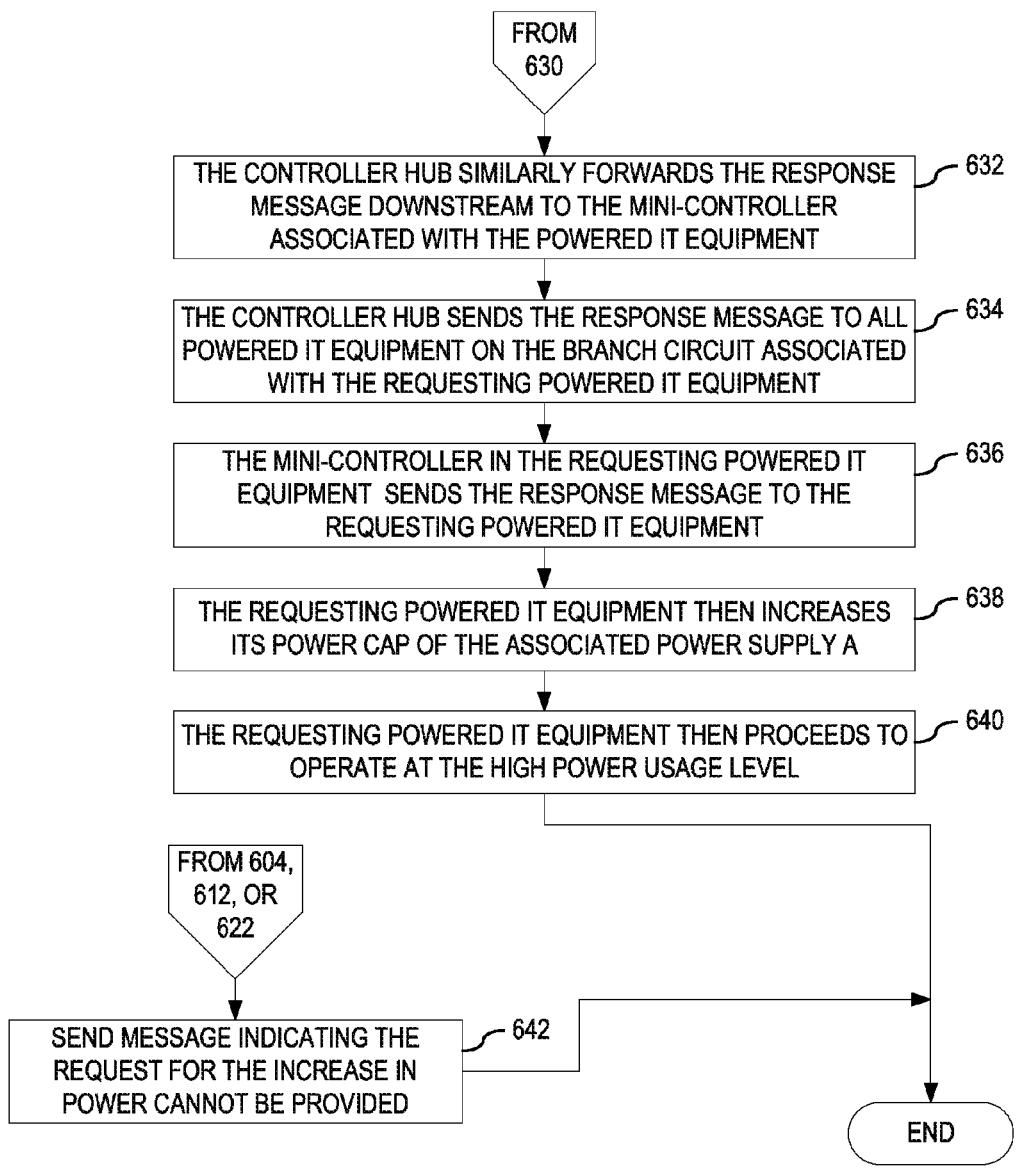

FIGS. 6A-6C depict an exemplary operation performed in requesting an increase in power allocated to powered IT equipment in accordance with an illustrative embodiment. As the operation begins, a powered IT equipment (either directly or through power management server) identities a need for additional power and initiate a request for an increase in power by sending the request to its associated one or more mini-controllers (step 602). The mini-controller verifies that the requested increase in power is below the maximum power available for the powered IT equipment (step 604). If at step 604 the mini-controller determines that the requested increase in power is below the maximum power that is available for the powered IT equipment, then the mini-controller forwards the request as a message to a controller hub by injecting the message via a modulated communication signal onto the powered IT equipment's branch circuit via a power line communication coupler (Step 606). A power line communication coupler associated with the controller detects the message and sends an interrupt to the controller (step 608).

The controller receives the interrupt and extracts the message using its associated power line communication coupler (step 610). Prior to forwarding the request, the controller hub verifies that the requested increase in power does not violate the branch circuit rating of the branch circuit of the powered IT equipment (step 612). If at step 612 the controller hub verifies that the branch circuit rating of the branch circuit has not been violated by the requested increase to allocated power on the branch circuit, then the controller hub forwards the request upstream to a power supplying device, such as a power utility provide, a backup generator, an uninterruptable power supply, or the like (step 614). The controller hub injects the message via a modulated communication signal onto a feeder using an associated power line communication (PLC) coupler (step 616).

A power line communication coupler in a switch gear or other distribution device associated with the power supplying device detects the message and sends an interrupt to the controller associated with the power supplying device (step 618). The controller receives the interrupt and extracts the message using the power line communication coupler (step 620). The controller associated with the power-supplying device determines whether the power supply device can provide the requested increase in power (step 622). If at step 622 the controller determines that the increase in power can be supplied by the power supplying device, then the controller initiates an increase in allocated power by signaling the power supplying device to increase its total allocated power and sends a response message back to the powered IT equipment (step 624). The controller injects the response message on the modulated communication signal on feeder using its associated power line communication coupler (step 626).

The power line communication coupler associated with the controller hub detects the message and sends an interrupt to the controller hub (step 628). The controller hub receives the interrupt and extracts the message using the power line communication coupler (step 630). Since the response message is for the requesting powered IT equipment, the controller hub forwards the response message downstream to the mini-controller associated with the powered IT equipment (step 632).

Figure 7:
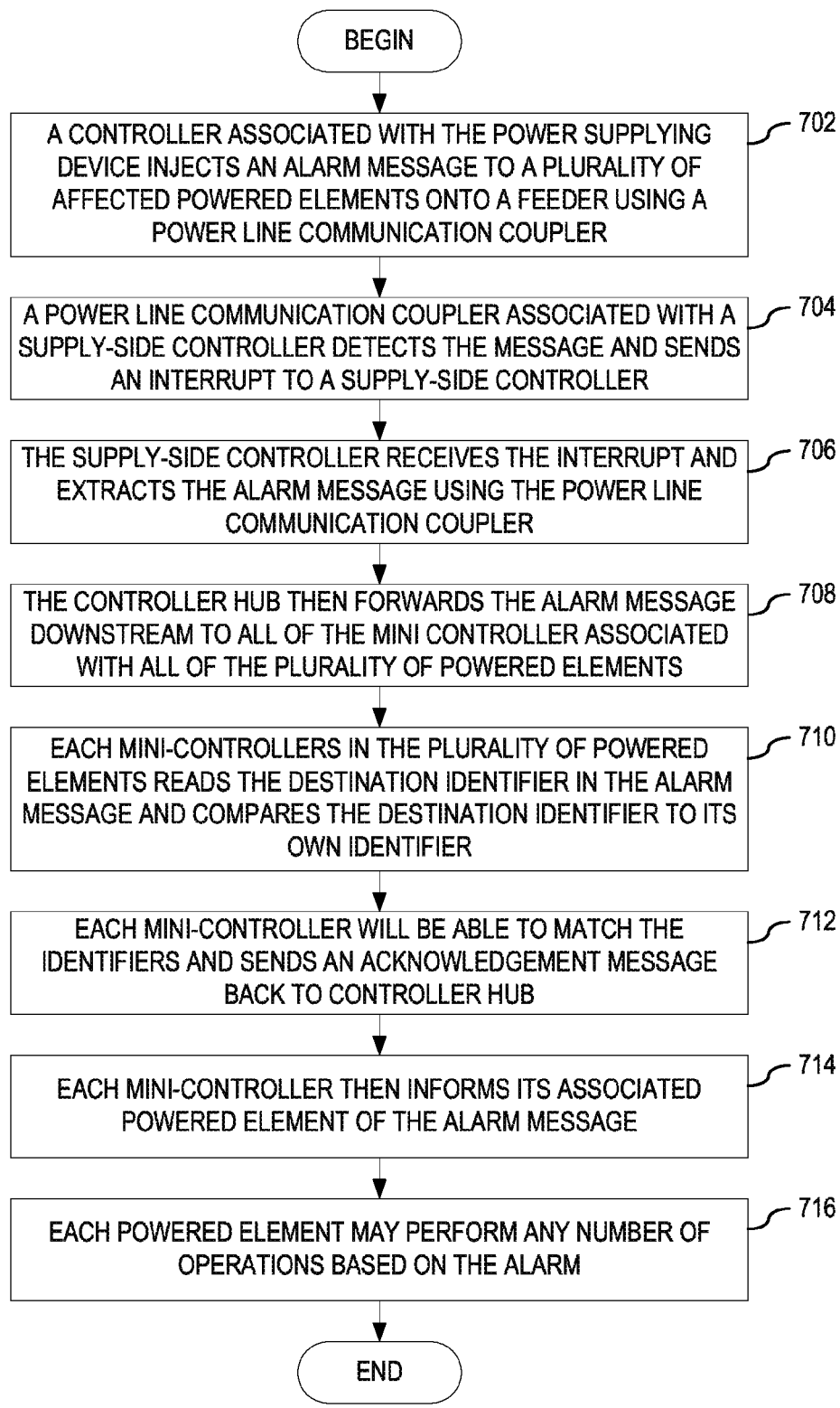
FIG. 7 depicts an exemplary operation performed in broadcasting alarm information to a plurality of powered IT equipment in accordance with an illustrative embodiment.

The controller hub sends the response message to all powered IT equipment on the branch circuit associated with the requesting powered IT equipment (step 634). However, since the response message is intended only for requesting powered IT equipment, then only the mini-controller of the requesting powered IT equipment will be able to match the identifiers, thus, the mini-controller in the requesting powered IT equipment sends the response message to the requesting powered IT equipment (step 636). The requesting powered IT equipment then increases its power cap of the associated power supply A (step 638). The requesting powered IT equipment then proceeds to operate at the high power usage level (step 640), with the operation ending thereafter. If at step 604 the mini-controller determines that the requested increase in power is above the maximum power that is available for the powered IT equipment, or if at step 612 the controller hub verifies that the branch circuit rating of the branch circuit has been violated, or if at step 622 the controller determines that the increase in power cannot be supplied by the power supplying device, then a response message is sent to the requesting powered IT equipment by either the mini-controller, the controller hub, or the controller associated with the power supplying device, respectively, indicating the request for the increase in power cannot be provided (step 642), with the operation ending thereafter FIG. 7 depicts an exemplary operation performed in broadcasting alarm information to a plurality of powered IT equipment in accordance with an illustrative embodiment. For example, in a situation where a power supplying device, such as a power utility provider, a backup generator, uninterruptable power supply, or the like, is aware that power will not be able to be delivered for a specific time interval due to line maintenance, weather problems, or the like, or if power supplying device is a backup generator or uninterruptible power supply that is failing or has limited time left to operate the following exemplary operation may be performed.

As the operation begins, a controller in a switch gear or other distribution device associated with the power supplying device injects an alarm message to a plurality of affected powered IT equipment onto a feeder using a power line communication coupler (step 702). A power line communication coupler associated with a controller hub detects the message and sends an interrupt to the controller hub (step 704). The controller hub receives the interrupt and extracts the alarm message using the power line communication coupler (step 706). The controller hub forwards the alarm message downstream to all of the mini-controller associated with all of the plurality of powered IT equipment (step 708).

Each mini-controller in the plurality of powered IT equipment reads the destination identifier in the alarm message and compares the destination identifier to its own identifier (step 710). Since the alarm message is intended for all of the plurality of powered IT equipment, then each mini-controller will be able to match the identifiers and sends an acknowledgement message back to controller hub (step 712). Each mini-controller then informs its associated powered IT equipment of the alarm message (step 714). At this point, each powered IT equipment may perform any number of operations based on the alarm, such as workload migration to a powered IT equipment not affected by the power issue, a workload decrease such that no additional work will be performed by the powered IT equipment, a switch over to a single power supply if both power supplies will not be affected, or the like (step 716), with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a mechanism is provided for direct communication channels between the powered IT equipment within a data center and the power distribution and supplying devices. A communication infrastructure is provided for power related communications is established on the power distribution lines (branch circuits) between the powered IT equipment in the data center and the power distribution equipment, such as power distribution panels, backup generator, uninterruptable power supplies, or the like.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A communication system for direct communication between powered elements, the communication system comprising:

a controller hub that injects a first message via a first modulated communication signal onto a branch circuit using a hub-side power line communication (PLC) coupler;
an element-side power line communication (PLC) coupler associated with a powered element in a set of powered elements that detects the first message and sends an interrupt to a mini-controller in the powered element;
the mini-controller:
  receives the interrupt from the element-side PLC coupler;
  extracts the first message using the element-side PLC coupler;
  reads a destination identifier in the first message;
  compares the destination identifier in the first message to a mini-controller identifier in the mini-controller;
  responsive to the destination identifier in the first message matching the mini-controller identifier, sends an acknowledgement message back to the controller hub; and
  forwards the first message to the powered element;
the powered element performs a command identified in the first message;
the powered element sends a second message to the mini-controller;
the mini-controller injects the second message via a second modulated communication signal onto the at least one branch circuit using the element-side PLC coupler;
the hub-side PLC coupler associated with the controller hub detects the second message and sends an interrupt to the controller hut;
the controller hob:
  receives the interrupt from the hub-side PLC coupler;
  extracts the second message using the hub-side PLC coupler;
  reads a destination identifier in the second message;
  compares the destination identifier in the second message to a controller hub identifier in the controller hub; and
  responsive to the destination identifier in the second message matching the controller hub identifier, sends an acknowledgement message back to powered element;
the controller hub performs a command identified in the second message, and
wherein the second message is a request for an increase in power by the powered element and wherein receiving the request for the increase in power further comprises:
  the mini-controller verifying that the requested increase in power is below a maximum power available for the powered element;
  responsive to the mini-controller determining that the requested increase in power is below the maximum power that is available for the powered element, the mini-controller forwards the second message to the controller hub;
  upon receiving the second message, controller hob verifies that the requested increase in power does not violate a branch circuit rating of the associated branch circuit;
  responsive to the controller hub verifying that the branch circuit rating of the associated branch circuit has not been violated, the controller hub forwards the request for the increase in power upstream to a power supplying device controller associated with a power supplying device;

upon receiving the second message, the power supplying device controller determines whether the power supply device can provide the requested increase in power;

responsive to the power supply device being capable of supplying the requested increase in power, the power supplying device increases power;

the power supplying device controller sends a response message back to the powered element; and the powered element increases its power cap in order to operate at the requested increase in power.

2. The communication system of claim 1, further comprising:

responsive to the destination identifier in the first message failing to match the mini-controller identifier, the mini-controller ignores the first message.

3. The communication system of claim 1, wherein the controller hub resides within a power distribution panel or substantially close to the power distribution panel.

4. The communication system of claim 1, further comprising:

responsive to the destination identifier in the second message failing to match the controller hub identifier, the controller hub forwards the second message either upstream or downstream to another controller hub.

5. The communication system of claim 1, further comprising:

responsive to the mini-controller determining that the requested increase in power is above the maximum power that is available for the powered element, the mini-controller sending an error message to the powered element indicating that the request for the increase in power cannot be provided.

6. The communication system of claim 1, further comprising:

responsive to the controller hub verifying that the branch circuit rating of the associated branch circuit has been violated, the controller hub sending an error message to the powered element indicating that the request for the increase in power cannot be provided.

7. The communication system of claim 1, further comprising:

responsive to the power supply device failing to be capable of supplying the requested increase in power, the power supplying device controller sending an error message to the powered element indicating that the request for the increase in power cannot be provided.

8. The communication system of claim 1, wherein the first message is an alarm message to the set of powered elements and wherein broadcasting the alarm message comprises:

a power supplying device controller associated with a power supplying device sending the alarm message to the set of powered elements, wherein the alarm message includes identifiers for each affected powered element in the set of powered elements;

at least one mini-controller receiving the alarm message and the powered element of the alarm message; and the powered element performing at least one operation in response to the alarm message, wherein the at least one operation is at least one of workload migration to a non-affected powered element, a workload decrease such that no additional work will be performed by the associated powered element, or a switch over to a single power supply if both power supplies of the associated powered element are not affected.

9. A computer program product comprising a computer readable storage medium having a computer readable program stored therein, wherein the computer readable program, when executed on a computing device, causes the computing device to:

receive an interrupt from a element-side power line communication (PLC) coupler associated with a powered element in a set of powered elements, wherein the PLC coupler detects a first message injected onto at least one branch circuit by a controller hub via a first modulated communication signal using at least one hub-side power line communication (PLC) coupler and wherein the at least one element-side PLC coupler sends the interrupt in response to detecting the first message on the branch circuit;

extract the first message using the at least one element-side PLC coupler;

read a destination identifier in the first message;

compare the destination identifier in the first message to a mini-controller identifier;

responsive to the destination identifier in the first message matching the mini-controller identifier, send an acknowledgement message back to the controller hub;

forward the first message to the powered element, wherein the powered performs a command identified in the first message;

inject a second message via a second modulated communication signal onto the at least one branch circuit using the element-side PLC coupler, wherein:

the second message is received from the powered element, the at least one hub-side PLC coupler associated with the controller hub detects the second message and sends an interrupt to the controller hub, the controller hub receives the interrupt from the hub-side PLC coupler, extracts the second message using the hub-side PLC coupler, reads a destination identifier in the second message, compares the destination identifier in the second message to a controller hub identifier in the controller hub, and, responsive to the destination identifier in the second message matching the controller hub identifier, sends an acknowledgement message back to powered element, and the controller hub performs a command identified in the second message;

wherein the second message is a request for an increase in power by the powered element and wherein, responsive to the request for the increase in power, verify that the requested increase in power is below a maximum power available for the powered element; and responsive determining that the requested increase in power is below the maximum power that is available for the powered element, forward the second message to the controller hub, wherein:

upon receiving the second message, the controller hub verifies that the requested increase in power does not violate a branch circuit rating of the associated branch circuit, responsive to the controller hub verifying that the branch circuit rating of the associated branch circuit has not been violated, the controller hub forwards the request upstream to a power supplying device controller associated with a power supplying device, upon receiving the second message, the power supplying device controller determines whether the power device can provide the requested increase in power, responsive to the power supply device being capable of supplying the requested increase in power, the power supplying device increases power, the power supplying device controller sends a response message back to the powered element, and the powered element increases its power cap in order to operate at the requested increase in power.

10. The computer program product of claim 9, wherein the controller hub resides within a power distribution panel or substantially close to the power distribution panel.

11. The computer program product of claim 9, wherein the first message is an alarm message to the set of powered elements and wherein the computer readable program further causes the computing device to:

receive the alarm message and informing the powered element of the alarm message, wherein:
the alarm message is sent from a power supplying device controller associated with a power supplying device,
the alarm message is sent to the set of powered elements,
the alarm message includes identifiers for each affected powered element in the set of powered elements, and
the powered element performs at least one operation in response to the alarm message, wherein the at least one operation is at least one of workload migration to a non-affected powered element, a workload decrease such that no additional work will be performed by the powered element, or a switch over to a single power supply if both power supplies of the powered element are not affected.

12. A method, in a data processing system, for directing communication between powered elements, the method comprising:

receiving an interrupt from a element-side power line communication (PLC) coupler associated with a powered element in a set of powered elements, wherein the PLC coupler detects a first message injected onto at least one branch circuit by a controller hub via a first modulated communication signal using at least one hub-side power line communication (PLC) coupler and wherein the at least one element-side PLC coupler sends the interrupt in response to detecting the first message on the branch circuit;

extracting the first message using the at least one element-side PLC coupler;

reading a destination identifier in the first message;

comparing the destination identifier in the first message to a mini-controller identifier;

responsive to the destination identifier in the first message matching the mini-controller identifier, sending an acknowledgement message back to the controller hub;

forwarding the first message to the powered element, wherein the powered element performs a command identified in the first message;

injecting a second message via a second modulated communication signal onto the at least one branch circuit using the element side PLC coupler, wherein:
the second message received from the powered element,
the at least one hub-side PLC coupler associated with the controller hub detects the second message and sends an interrupt to the controller hub,
the controller hub receives the interrupt from the hub-side PLC coupler, extracts the second message using the hub-side PLC coupler, reads a destination identifier in the second message, compares the destination identifier in the second message to a controller hub identifier in the controller hub, and, responsive to the destination identifier in the second message matching the controller hub identifier, sends an acknowledgement message back to powered element, and
the controller hub performs a command identified in the second message; and wherein the second message is a request for an increase in power by the powered element and wherein, responsive to the request for the increase in power, further comprises:
verifying that the requested increase in power is below a maximum power available for the powered element; and
responsive to the mini-controller determining that the requested increase in power is below the maximum power that is available for the powered element, forwarding the second message to the controller hub, wherein:
upon receiving the second message, the controller hub verifies that the requested increase in power does not violate a branch circuit rating of the associated branch circuit,
responsive to the controller hub verifying that the branch circuit rating of the associated branch circuit has not been violated, the controller hub forwards the request upstream to a power supplying device controller associated with a power supplying device,
upon receiving the second message, the power supplying device controller determines whether the power supply device can provide the requested increase in power,
responsive to the power supply device being capable of supplying the requested increase in power, the power supplying device increases power,
the power supplying device controller sends a response message back to the powered element, and
the powered element increases its power cap in order to operate at the requested increase in power.

13. The method of claim 12, wherein the controller hub resides within a power distribution panel or substantially dose to the power distribution panel.

14. The method of claim 12, wherein the first message is an alarm message to the set of powered elements and wherein the method further comprises:

receiving the alarm message and informing the powered element of the alarm message, wherein:
the alarm message is sent from a power supplying device controller associated with a power supplying device,
the alarm message is sent to the set of powered elements,
the alarm message includes identifiers for each affected powered element in the set of powered elements, and
the powered element performs at least one operation in response to the alarm message, wherein the at least one operation is at least one of workload migration to a non-affected powered element, a workload decrease such that no additional work will be performed by the powered element, or a switch over to a single power supply if both power supplies of the powered element are not affected.

* * * * *